(12) United States Patent
Picker

(10) Patent No.: US 8,634,339 B2
(45) Date of Patent: Jan. 21, 2014

(54) METHODS AND SYSTEMS FOR SHARING RESOURCES BETWEEN A RADIO ACCESS NETWORK AND A BACKHAUL NETWORK

(75) Inventor: Dan Picker, San Diego, CA (US)

(73) Assignee: PureWave Networks, Inc, Santa Clara, CA (US)

( * ) Notice: Subject to any disclaimer, the term of this patent is extended or adjusted under 35 U.S.C. 154(b) by 324 days.

(21) Appl. No.: 13/219,690

(22) Filed: Aug. 28, 2011

(65) Prior Publication Data

US 2013/0051308 A1  Feb. 28, 2013

(51) Int. Cl.
*H04B 7/14* (2006.01)
*H04B 3/36* (2006.01)
*H04B 7/185* (2006.01)

(52) U.S. Cl.
USPC .......................... 370/315; 375/211; 455/13.3

(58) Field of Classification Search
USPC .......................... 370/315; 375/211; 455/13.3
See application file for complete search history.

(56) References Cited

U.S. PATENT DOCUMENTS

| 7,349,665 | B1 | 3/2008 | Zhu et al. |
| 7,826,807 | B2 | 11/2010 | Laroia et al. |
| 7,962,145 | B2 | 6/2011 | Gale et al. |
| 2004/0062214 | A1 | 4/2004 | Schnack et al. |
| 2006/0116182 | A1 | 6/2006 | Bekritsky |

*Primary Examiner* — Afshawn Towfighi

(57) ABSTRACT

Various embodiments are presented for combining features of a Radio Access Network (RAN) and those of a backhaul link or Network. In particular, and unlike the prior art, certain hardware and software resources are shared by the two Networks as needed. Such resources may include, for example, radio transceiver chains, interconnects, interconnect matrices, and RF power combiners. These resources will be dedicated on a time and need basis to either Network. This sharing permits the economizing of resources. Also, the aggregated transmission power of the radio transceiver chains previously used for RAN communication can now be utilized for backhaul transmission, or the aggregated reception capability for multiple chains used for RAN communication can now be used to improve reception when receiving transmissions from the Core Network.

37 Claims, 14 Drawing Sheets

METHODS AND SYSTEMS FOR SHARING RESOURCES BETWEEN A RADIO ACCESS NETWORK AND A BACKHAUL NETWORK

BACKGROUND

Wireless systems performing relay functions often include both a Radio Access Network (RAN) for communication between a base station and mobile subscriber stations, and a backhaul link or network for communication between a base station and a Core Network. These two Networks are inefficiently independent, with completely separate RF chains.

BRIEF SUMMARY

In one embodiment, there is presented a method for wirelessly relaying data between a Core Network and a Radio Access Network (RAN), utilizing the aggregated Radio Frequency (RF) power of a plurality of radio transceiver chains. In a particular configuration of such embodiment, a RAN is set up and operated. The RAN includes a wireless Base Station (BS), which itself includes N radio transceiver chains and corresponding N RAN antennas, where N is equal to or greater than two. In this particular configuration of the embodiment, data is communicated wirelessly between at least one wireless Subscriber Station (SS) and the wireless BS, via the N radio transceiver chains and the corresponding N RAN antennas. The N radio transceiver chains are then disconnected from the N RAN antennas, after which the N radio transceiver chains are then connected to N radio signal pathways leading to M number of Backhaul antennas that belong to the wireless BS. Once the connection is made to the Backhaul antennas, according to this configuration of the embodiment, some of the data is communicated wirelessly, via the N radio transceiver chains and the M Backhaul antennas, from the wireless BS to a wireless transceiver of the Core Network, utilizing the aggregated RF power of the N radio transceiver chains.

In one embodiment, there is presented a system for wirelessly relaying data between a Core Network and a RAN, comprising N radio transceiver chains wherein N is equal to at least two, N RAN antennas forming radiation patterns covering a first location of at least one wireless SS, N Backhaul antennas forming a radiation pattern covering a second location of a wireless transceiver belonging to the Core Network and N RF switches. In a particular configuration of such embodiment, the system communicates data wirelessly with at least one wireless SS via the N radio transceiver chains and the corresponding N RAN antennas, switch the N radio transceiver chains from the N RAN antennas to the N Backhaul antennas using the N RF switches and communicate wirelessly at least some of the data, via the N radio transceiver chains and the N Backhaul antennas, with the wireless transceiver of the Core Network, utilizing the aggregated RF power of the N radio transceiver chains.

In one embodiment, there is a presented a system for wirelessly relaying data between a Core Network and a RAN, comprising N radio transceiver chains wherein N is equal to at least two, N RAN antennas forming radiation patterns covering a first location of at least one wireless SS, one Backhaul antenna forming a radiation pattern covering a second location of a wireless transceiver belonging to the Core Network, N RF switches, and an RF power combiner. In a particular configuration of such embodiment, the system communicates data wirelessly with at least one wireless SS via the N radio transceiver chains and the corresponding N RAN antennas, switch the N radio transceiver chains from the N RAN antennas to the one Backhaul antenna using the N RF switches and RF power combiner, and communicate wirelessly at least some of the data via the N radio transceiver chains and the one Backhaul antenna, with the wireless transceiver of the Core Network, utilizing the aggregated RF power of the N radio transceiver chains.

In one embodiment, there is presented a method for wirelessly relaying data between a Core Network and a RAN utilizing an aggregated RF power of a plurality of radio transceiver chains. In a particular configuration of such embodiment, a RAN is set up and operated. The RAN includes wireless Base Station (BS), the wireless BS comprising N radio transceiver chains and a RAN antenna, wherein N is equal to at least two. In this particular configuration of the embodiment, N radio transceiver chains are connected to the RAN antenna via an RF power combiner. Data is then communicated wirelessly between at least one wireless SS and the wireless BS, via the N radio transceiver chains and the RAN antenna, utilizing the aggregated RF power of the N radio transceiver chains. In this particular configuration of the embodiment, the N radio transceiver chains are then disconnected from the N RAN antennas, after which the N radio transceiver chains are then connected to N Backhaul antennas belonging to the wireless BS. Once the connection is made to the Backhaul antennas, according to this configuration of the embodiment, there is communicated wirelessly, via the N radio transceiver chains and the N Backhaul antennas, some of the data, from the wireless BS to a wireless transceiver of the Core Networks.

In one embodiment, there is presented a system for wirelessly relaying data between a Core Network and a RAN, comprising N radio transceiver chains wherein N is equal to at least two, a RAN antenna covering a first location of at least one wireless SS, N Backhaul antennas covering a second location of a wireless transceiver belonging to the Core Network, N RF switches, and RF power combiner. In a particular configuration of such embodiment, the system communicates data wirelessly with at least one wireless SS via the N radio transceiver chains connected to the RAN antenna via the RF power combiner, utilizing the aggregated RF power of the N radio transceiver chains. In this particular configuration of the embodiment, the N radio transceiver chains are switched from the RAN antenna to the N Backhaul antennas using the N RF switches. There is communicated wirelessly at least some of the data via the N radio transceiver chains and the N Backhaul antennas, with the wireless transceiver of the Core Network.

In one embodiment, there is presented a system for wirelessly relaying data between a Core Network and a RAN, comprising N radio transceiver chains, wherein N is equal to at least two, L RAN antennas covering a first location of at least one wireless SS wherein L is equal to or less than N, M Backhaul antennas covering a second location of a wireless transceiver belonging to the Core Network wherein M is equal to or less than N, and an interconnect matrix switching and power-combine the N radio transceiver chains with the L RAN antennas and the M Backhaul antennas. In a particular configuration of such embodiment, the system includes communicates data wirelessly with at least one wireless SS via at least two of the N radio transceiver chains connected to the at least one of the L RAN antenna via the interconnect matrix, connect at least two of the N radio transceiver chains to at least one of the M Backhaul antennas using the interconnect matrix, and communicate wirelessly with the wireless transceiver of the Core Network at least some of the data, via the recently connected radio transceiver chains and the at least one of the M Backhaul antennas.

BRIEF DESCRIPTION OF THE DRAWINGS

Embodiments of the present invention are herein described, by way of example only, with reference to the accompanying drawings. With specific reference now to the drawings, it is stressed that the particulars shown are by way of example and for purposes of illustrative discussion of embodiments of the present invention only, and are presented in order to provide what is believed to be the most useful and readily understood description of the principles and conceptual aspects of embodiments of the present invention. In this regard, no attempt is made to show structural details of embodiments in more detail than is necessary for a fundamental understanding of the invention. In the drawings.

DETAILED DESCRIPTION

Various embodiments are presented for combining features of a Radio Access Network (RAN) and those of a backhaul link or Network. In particular, and unlike the prior art, certain hardware and software resources are shared by the two Networks as needed. Such resources may include, for example, radio transceiver chains, interconnects, interconnect matrices, and RF power combiners. These resources will be dedicated on a time and need basis to either Network. This sharing permits the economizing of resources. In addition, the aggregated transmission power of the radio transceiver chains previously used for RAN communication can now be utilized for backhaul transmission, or the aggregated reception capability for multiple chains used for RAN communication can now be used to improve reception when receiving transmissions from the Core Network.

Figure 1A:
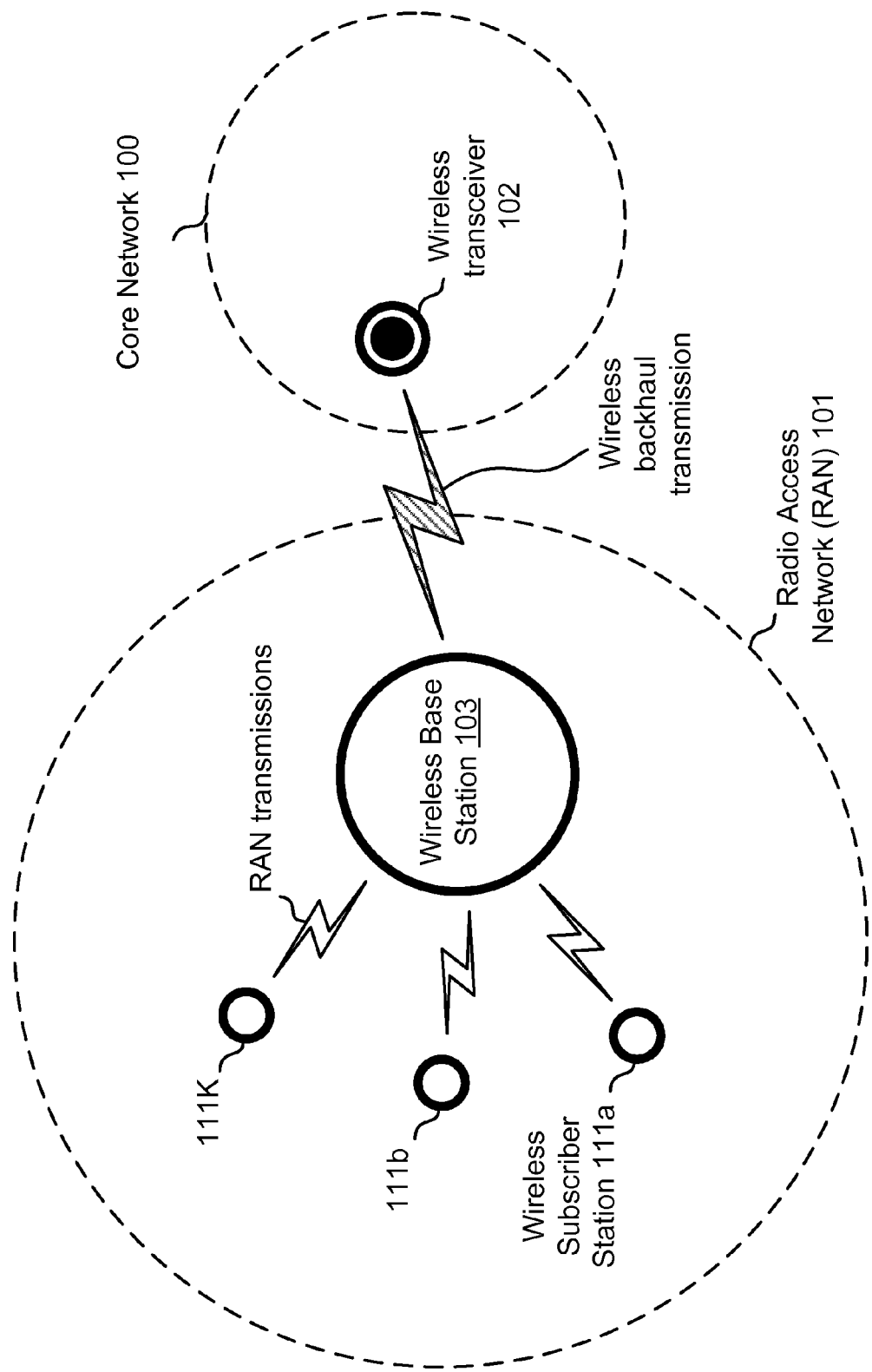
FIG. 1A illustrates one embodiment of components comprising a system.

FIG. 1A shows one embodiment of components comprising a system. In FIG. 1A, there is a wireless backhaul transmission between the wireless transceiver 102 of a Core Network 100, and the wireless BS 103 of a RAN 101. Non-limiting examples of the transmission path between the Core Network 100 and the wireless BS 103 include a point-to-point wireless connection, a point to multipoint wireless connection, a satellite connection, or other wireless connection. Elements 111a, 111b, and 111K, represent various SS units 111a-111K in communication with the wireless BS 103 of the RAN 101. Non-limiting examples of the SS units 111a-111K include wireless telephones, smartphones, wireless PDAs, and wireless modems.

Figure 1B:
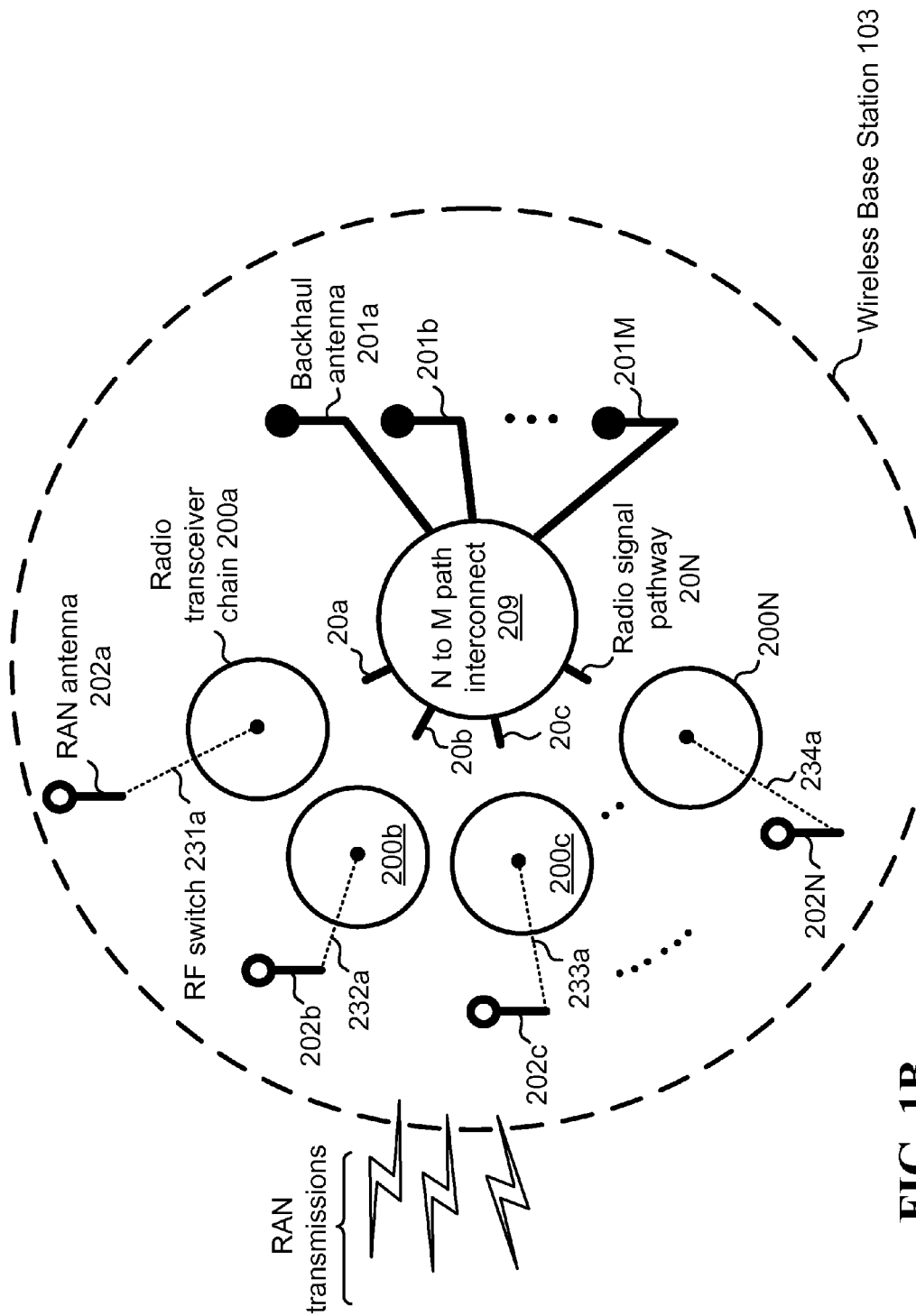
FIG. 1B illustrates one embodiment of components comprising a system, in which RAN antennas are connected to radio transceiver chains.

FIG. 1B shows one possible configuration at a particular point in time. In this configuration, there is a connection between the radio transceiver chains 200a, 200b, 200c, ... 200N, and the corresponding RAN antennas 202a, 202b, 202c, ... 202N. These connections are made by the corresponding RF switches 231a, 232a, 233a, and 234a. At the point of time conveyed by FIG. 1B, there is not a connection between radio transceiver chains and the other components of this embodiment.

Figure 1C:
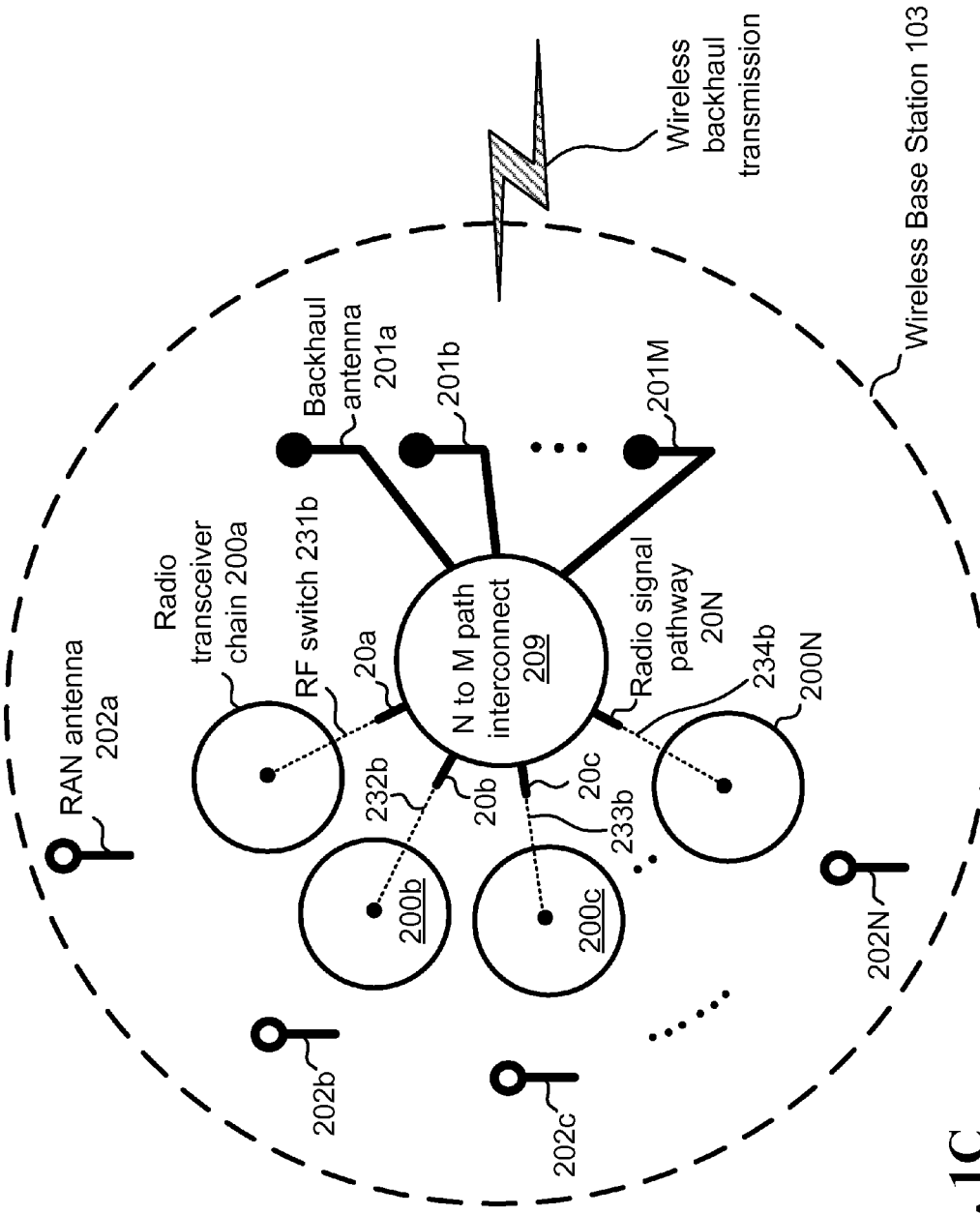
FIG. 1C illustrates one embodiment of components comprising a system in which radio transceiver chains are connected to an interconnect.

FIG. 1C, in contrast to FIG. 1B, shows a point of time at which there is no connection between the RAN antennas 202a-202N and the radio transceiver chains 200a-200N, but there is connection between the radio transceiver chains 200a-200N and the other components of the embodiment. In particular, the RF switches 231a-234a have now been turned off from the RAN antennas 202a-202N, and instead turned on to interconnect 209. The connection via the RF switches, connects the radio transceiver chains, via radio pathway signals 20a, 20b, 20c, ... 20N, to interconnect 209. The RF switches 231a-234a in a mode that connects the radio transceiver chains 200a-200N to the interconnect 209 are depicted as 231b, 232b, 233b, and 234b, whereas the series 231a, 232a, 233a, and 234a, appeared in FIG. 1B rather than here, and showed connection to RAN antennas which is not shown here. FIG. 1C also shows connection of interconnect 209 to the Backhaul antennas 201a, 201b, ... 201M.

Taken together, FIG. 1B and FIG. 1C show initial RAN transmissions and initial connection to the RAN antennas 202a-202N, followed by connection of the N radio transceiver chains among 200a-200N to interconnect 209, followed by or simultaneously with connection between interconnect 209 and M Backhaul antennas 201a-201M. Element 209 is termed "N to M path interconnect", because it is able to connect all of the N radio transceiver chains, with all of the M Backhaul antennas. Hence, there are N to M path interconnections.

Structural elements presented in FIGS. 1A, 1B, and 1C, allow implementation of various methods for wirelessly relaying data between a Core Network 100 and a Radio Access Network (RAN) 101, utilizing an aggregated Radio Frequency (RF) power of a plurality of radio transceiver chains. In one embodiment, a RAN 101 operates, in which the RAN 101 includes a wireless BS 103, which itself includes N radio transceiver chains 200a-200N and N corresponding RAN antennas 202a-202N, all as shown in FIG. 1B and FIG. 1C. In this embodiment, N may be two, or more than two, but N may not be one or zero. In this embodiment, data is communicated wirelessly between at least one wireless SS among 111a-111K and the wireless BS 103. After the connection has been made by the RF switches 231a-234a between the N RAN antennas 202a-202N, the N radio transceiver chains 200a-200N and the wireless BS 103, and after wireless communication has occurred along this path from RAN 101 to the wireless BS 103, the wireless BS 103 disconnects the N radio transceiver chains 200a-200N from the corresponding N RAN antennas 202a-202N. After this disconnection, the wireless BS 103 then creates a new connection between the N radio transceiver chains 202a-202N, via the N radio signal pathways 20a-20N, to the M Backhaul antennas 201a-201M. Via this new connection, at least some of the data received via the N RAN antennas 202a-202N is communicated wirelessly from the wireless BS 103 and a wireless transceiver 102 of the Core Network 100.

In the wireless communication between the wireless BS 103 and the transceiver 102 of the Core Network 100, at least some of the RF power from two or more of the N radio transceiver chains 200a-200N is aggregated in order to increase the RF power of the communication between the wireless BS 103 and the transceiver 102 of the Core Network 100. Optionally, all or substantially all, of the RF power from all of the N radio transceiver chains 200a-200N is aggregated and used in this manner. It is possible that the RF power from two or more, but not all, of the N radio transceiver chains 200a-200N is aggregated and used in this manner. In all cases, whatever the combination, there is an additive effect of combining RF power from two or more radio transceiver chains 200a-200N.

This additive power may be used in any number of ways, well known in the art. For example, it may be used to increase the transmission power of transmissions from the wireless BS 103 to the wireless transceiver 102 of the Core Network 100. Or for example, it may be used to increase the reception sensitivity of transmission received by the wireless BS 103 from the wireless transceiver 102 of the Core Network 100.

In one embodiment, data is wirelessly relayed between a Core Network 100 and a RAN 101, utilizing an aggregated Radio Frequency (RF) power of a plurality of radio transceiver chains 200a-200N. A RAN 101 including a wireless BS 103, operates, in which the wireless BS 103 includes N radio transceiver chains 20a-200N and at least two corresponding RAN antennas 202a-202N. Data is communicated wirelessly between at least one wireless Subscriber Station (SS) 111a-111K and the wireless BS 103, via the N radio transceiver chains 200a-200N and the corresponding N RAN antennas 202a-202N. The wireless BS 103 disconnects the N radio transceiver chains 200a-200N from the N RAN antennas 202a-202N. The wireless BS 103 connects the N radio transceiver chains 200a-200N to N radio signal pathways 20a-20N leading to M Backhaul antennas 201a-201M belonging to the wireless BS 103. At least some of the data is wireless communicated, via the N radio transceiver chains 200a-200N and the M Backhaul antennas 201a-201M, between the wireless BS 103 and a wireless transceiver 102 of the Core Network 100, utilizing the aggregated RF power of the N radio transceiver chains 200a-200N.

In one embodiment, the M Backhaul antennas 201a-201M are better situated, as compared to the N RAN antennas 202a-202N, to facilitate communication with a wireless transceiver 102 belonging to the Core Network 100. The concept of a "better situated" antenna is illustrated in FIGS. 5 and 6.

Figure 5:
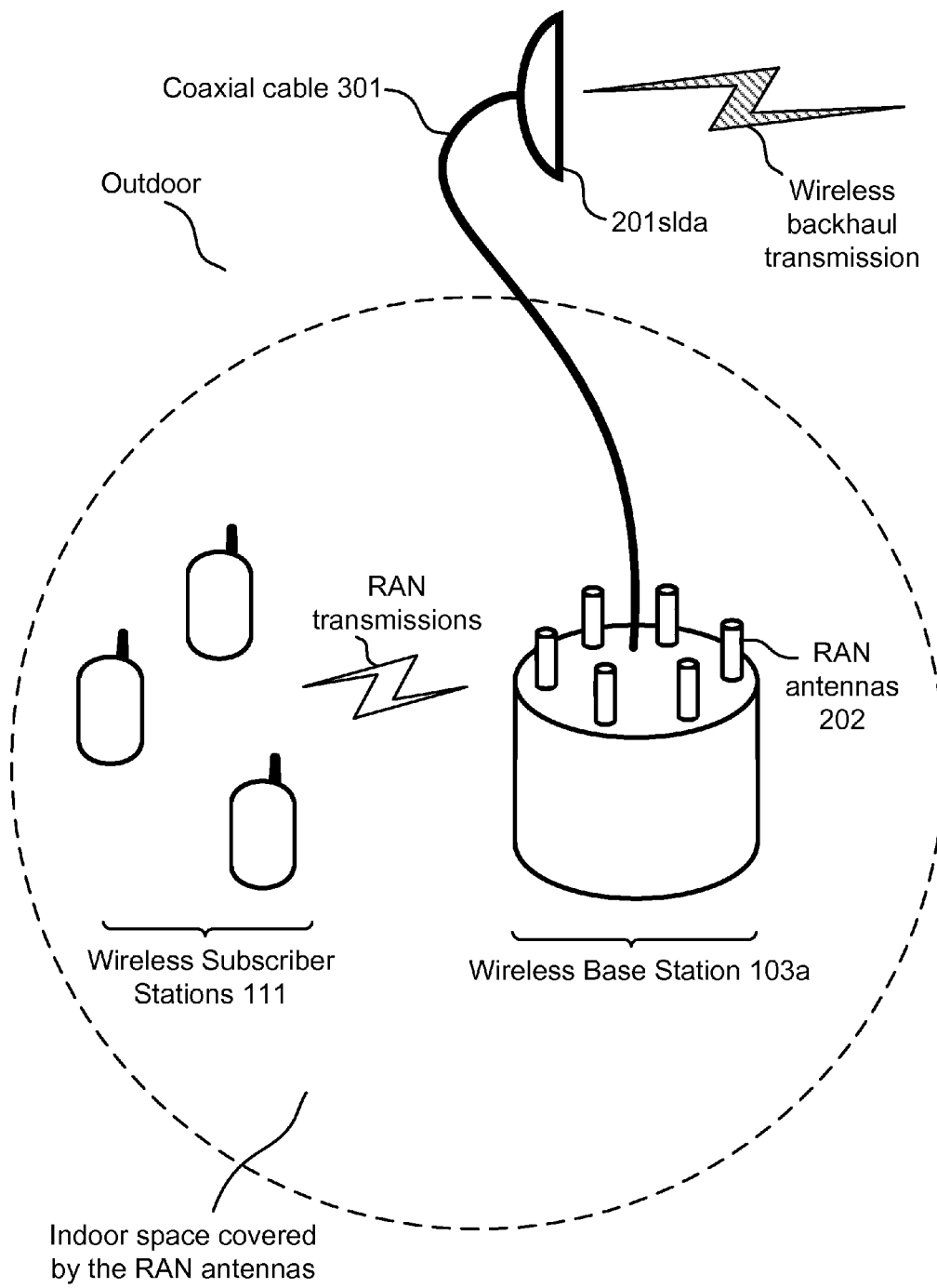
FIG. 5 illustrates one embodiment of components comprising a system in which the elements of a RAN are encompassed within an indoor space, while a Backhaul antenna of a Core Network is not within said indoor space.

FIG. 5 illustrates one embodiment of a wireless base station 103a with the particular form shown in FIG. 5. Wireless subscriber stations are shown as 111. RAN antennas are shown as 202, and these have RAN transmissions with the wireless subscriber stations 111. A coaxial cable 301 runs to a directional antenna 201slda, which communicates with a wireless backhaul transmission. In FIG. 5, all of the elements, except for part of cable 301 and antenna 201alda, are located in an indoor space, whereas part of 301 and all of 201 are outside. In this non-limiting example, the placement of antenna 201slda facilitates communication with wireless transceiver 102 belonging to the Core Network 100, so that 201slda can be said to be better situated for such communication than the RAN antennas 202a-202N.

Figure 6:
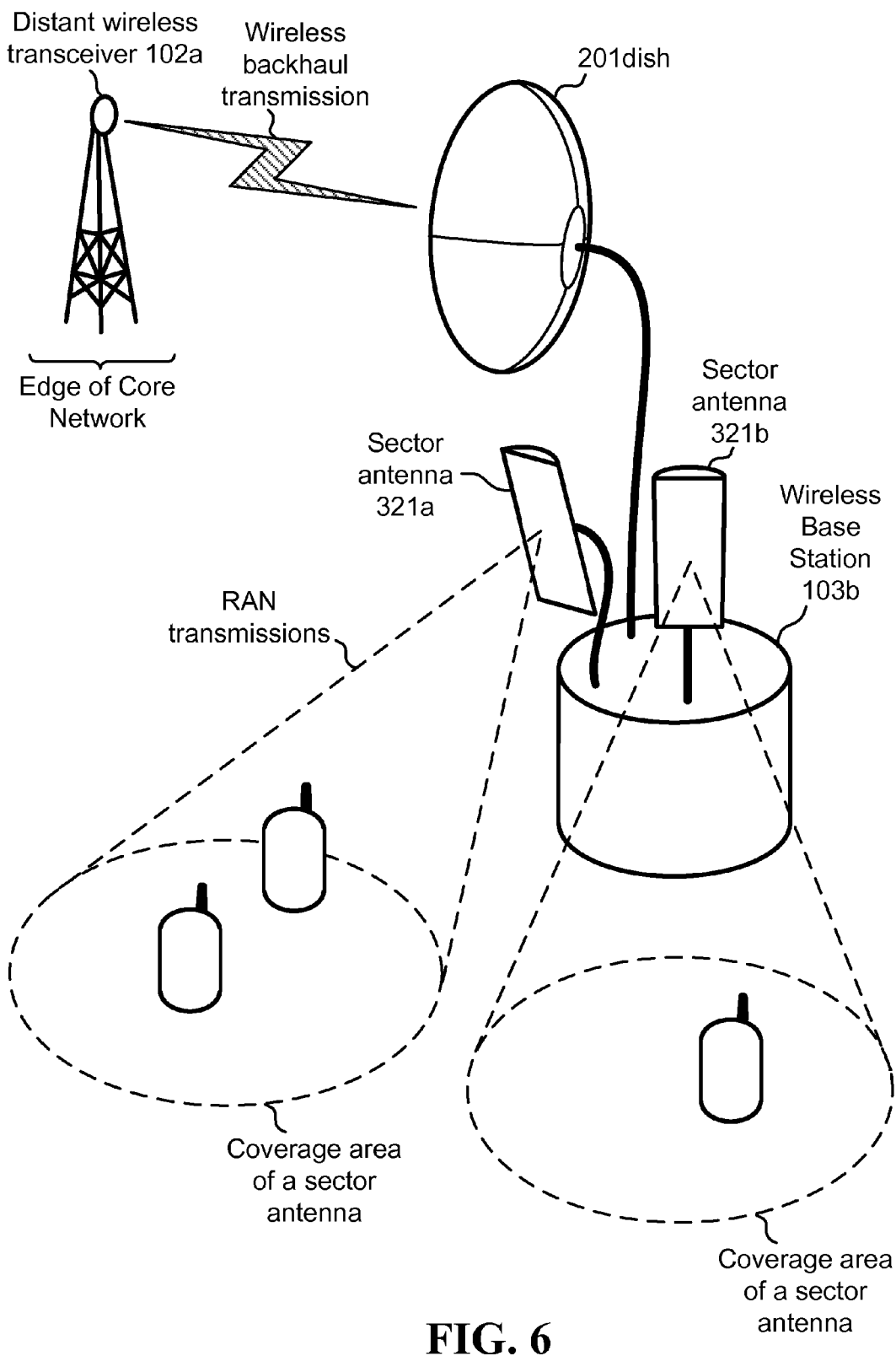
FIG. 6 illustrates one embodiment of components comprising a system in which the RAN includes sector antennas, while the Backhaul antenna is situated in a different place than the place of the RAN sector antennas and in which the Backhaul antenna is pointed in a different direction than the coverage areas of the RAN sector antennas.

FIG. 6 illustrates one embodiment of a wireless base station 103b, which includes at least one or more sectoral antennas, here shown on sector antenna 321a and sector antenna 321b, in which sectoral antenna communicates with a particular coverage area. In FIG. 6, the sectors are illustrated as non-overlapping, but it is understood that the sectors may overlap in whole or in part, according to the system requirements and needs. In FIG. 6, there is an antenna 201 dish, which communicates via wireless backhaul transmissions to a distant wireless transceiver 102a. FIG. 6 illustrates that 201 dish is physically higher than sector antennas 321a and 321b. This greater height facilitates communication with wireless transceiver 102 belonging to the Core Network 100, so that 201 dish can be said to be better situated for such communication than the sector antennas 321a and 321b. In addition, the sector antennas 321a and 321b are pointed in direction that enhances coverage of the sector, whereas 201 dish is pointed in a direction that facilities communication with wireless transceiver 102 belonging to Core Network 100, so that 201 dish can be said to be better situated for such communication than the sector antennas 321a and 321b.

Any one or more of indoor/outdoor, height, or position, can allow a backhaul antenna to be better situated than sector antennas for communication with a Core Network.

In one embodiment, M (the number of backhaul antennas 201a-201N) equals N (the number of radio transceiver chains 200a-200N), each of the N radio transceiver chains 200a-200N connects to a corresponding one of the M Backhaul antennas 201a-201M via a corresponding one of the N radio signal pathways 20a-20N, and the M Backhaul antennas 201a-201M form a phased array antenna substantially directed toward the wireless transceiver 102 belonging to the Core Network 100.

Figure 2A:
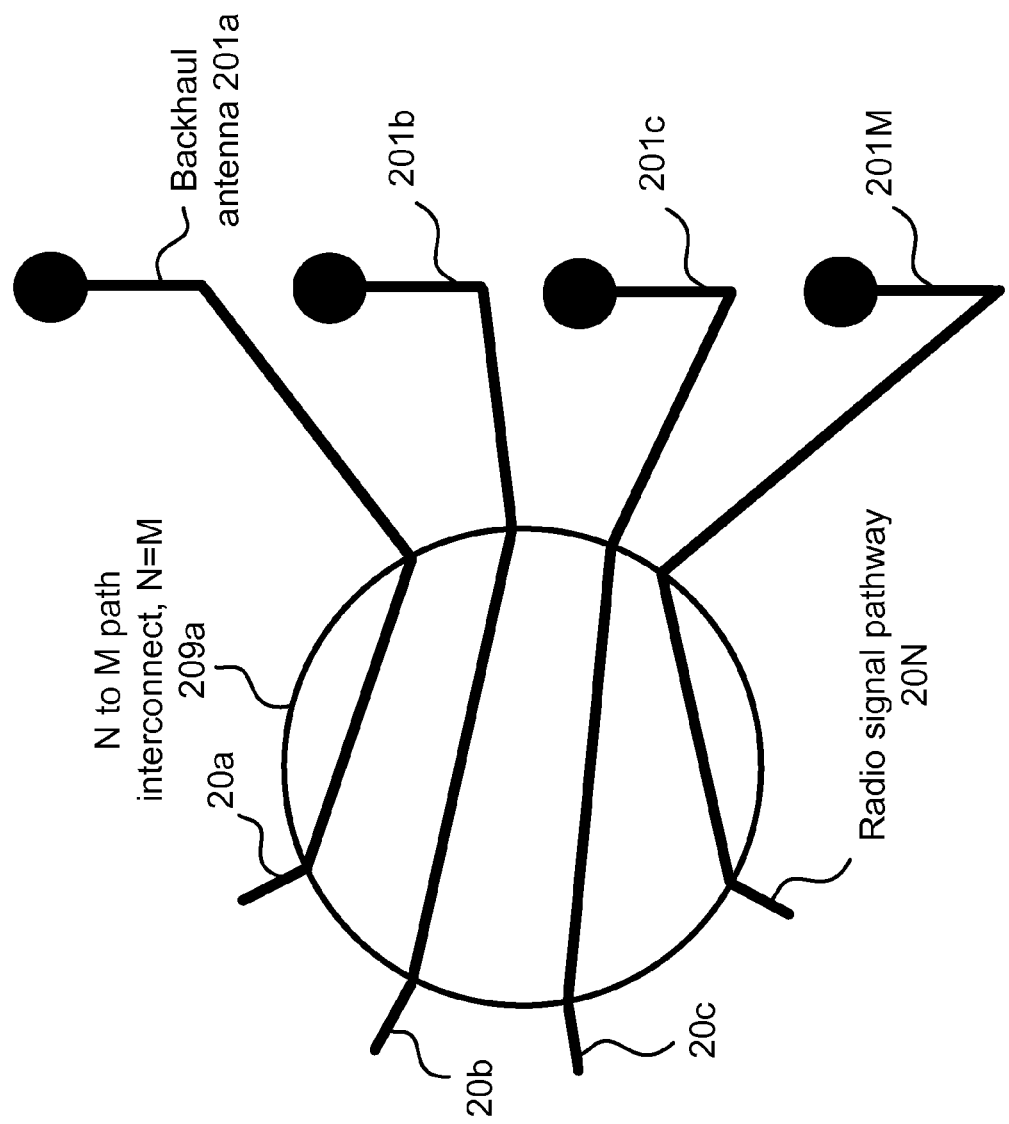
FIG. 2A illustrates one embodiment of components comprising a system in which N radio signal pathways connected to N Backhaul antennas.

FIG. 2A illustrates one embodiment of a N to M path interconnect 209a, in which there is each of the N radio transceiver chains 200a-20N connects, via radio signal pathways 20a-20N, to a corresponding backhaul antenna, shown as 201a, 201b, 201c, and 201M. FIG. 2A also illustrates that the backhaul antennas 201a-201M, for a phased array antenna. The phased array antenna is substantially directed toward the wireless transceiver 102 belonging to the Core Network 100, although elements 100 and 102 are not included in FIG. 2A.

Figure 3:
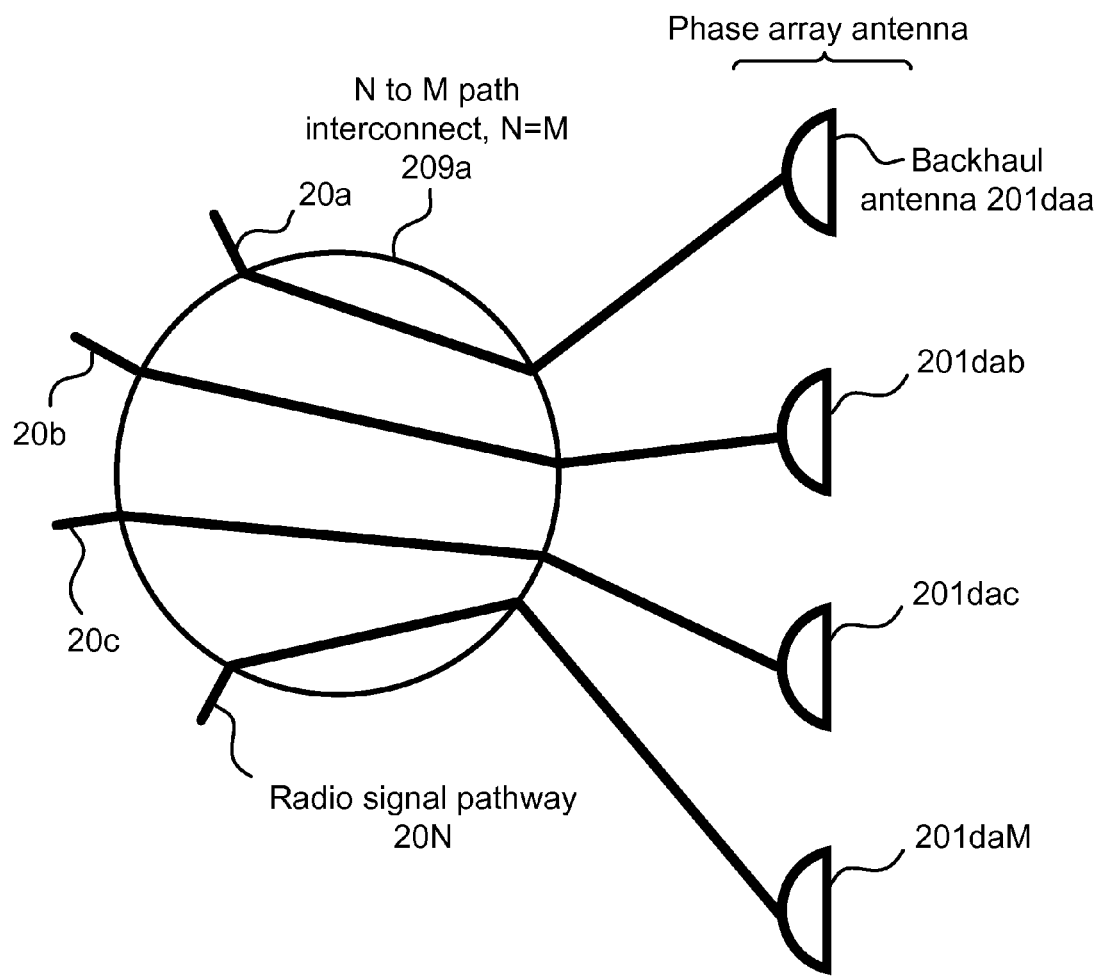
FIG. 3 illustrates one embodiment of components comprising a system in which N radio signal pathways are connected to N Backhaul antennas, and in which the N Backhaul antenna form a phased array antenna.

FIG. 3 illustrates one embodiment of an N to M path interconnect 209a, in which M Backhaul antennas 201a-201M for a phased array antenna substantially directed toward the wireless transceiver 102 belong to the Core Network 100, and each of the Backhaul antennas is a dish antenna, as depicted 201daa, 201dab, 201dac, and 201daM. It is also possible, though not shown in FIG. 2A or in FIG. 3, that some of the backhaul antennas will be dish antennas while some of the backhaul antennas will be omni-directional or other non-dish antennas.

In one embodiment, the combined RF output power of the N radio transceiver chains 200a-200N is substantially fully transferred to the phased array antenna.

In one embodiment, the combined RF input power of the N radio transceiver chains 200a-200N is utilized to increase reception sensitivity of the wireless BS 103 in respect to signals arriving from the wireless transceiver of the Core Network 102 via the phased array antenna.

In one embodiment, the RF phases of the N radio transceiver chains 200a-200N are adjusted to correspond with a phase configuration forming a beam pattern directed toward the wireless transceiver 102 of the Core Network 100, prior to wirelessly communicating the at least some of the data between the wireless BS 103 and the wireless transceiver 102 of the Core Network 100.

In one embodiment, M equals N, and each of the N radio transceiver chains 200a-200N connects to a corresponding one of the M Backhaul antennas 201a-201M via a corresponding one of the N radio signal pathways 20a-20N, and the M Backhaul antennas 201a-201M form a Multiple-In-Multiple-Out (MIMO) antenna configuration together with antennas of the wireless transceiver 102 belonging to the Core Network 100.

In one embodiment, the combined RF output power of the N radio transceiver chains 200a-200N is substantially fully transferred to the MIMO antenna configuration.

In one embodiment, the combined RF input power of the N radio transceiver chains 200a-200N is utilized to increase reception sensitivity of the wireless BS 103 in respect to signals arriving from the wireless transceiver 102 of the Core Network 100 via the MIMO antenna configuration.

In one embodiment, at least some of the data is re-coded to M streams of data facilitating the MIMO antenna configuration, and fed to the N radio transceiver chains 200a-200N connected to the M Backhaul antennas 201a-201M with the M streams of data respectively.

Figure 2B:
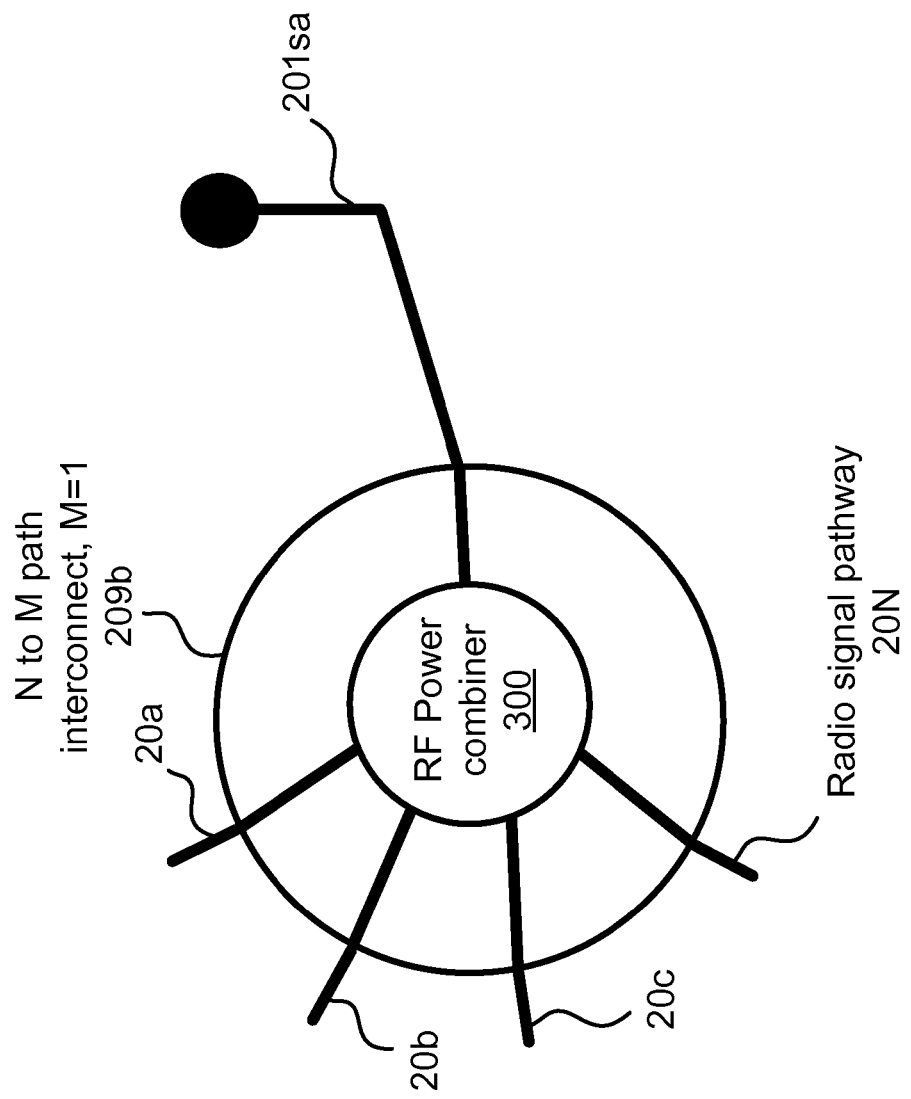
FIG. 2B illustrates one embodiment of components comprising a system in which N radio signal pathways are combined by an RF power combiner into one Backhaul antenna.

In one embodiment, the M number of Backhaul antennas is one (that is, there is one backhaul antenna from the possible selection of 201a-201M), the N radio signal pathways 20a-20N are merged into one radio signal pathway connected to the one Backhaul antenna, and the one Backhaul antenna is substantially directed toward the wireless transceiver 102 belonging to the Core Network 100. FIG. 2B illustrates this embodiment, in which the radio signal pathways 20a-20N are merged by an RF Power combiner 300, located within or near the N to M path interconnect 209b, wherein the single merged radio signal pathway is directed to one backhaul antenna 201sa. Backhaul antenna 201sa is substantially directed toward the wireless transceiver 102 belonging to the Core Network 100, although elements 100 and 102 are not illustrated in FIG. 2B.

Figure 4:
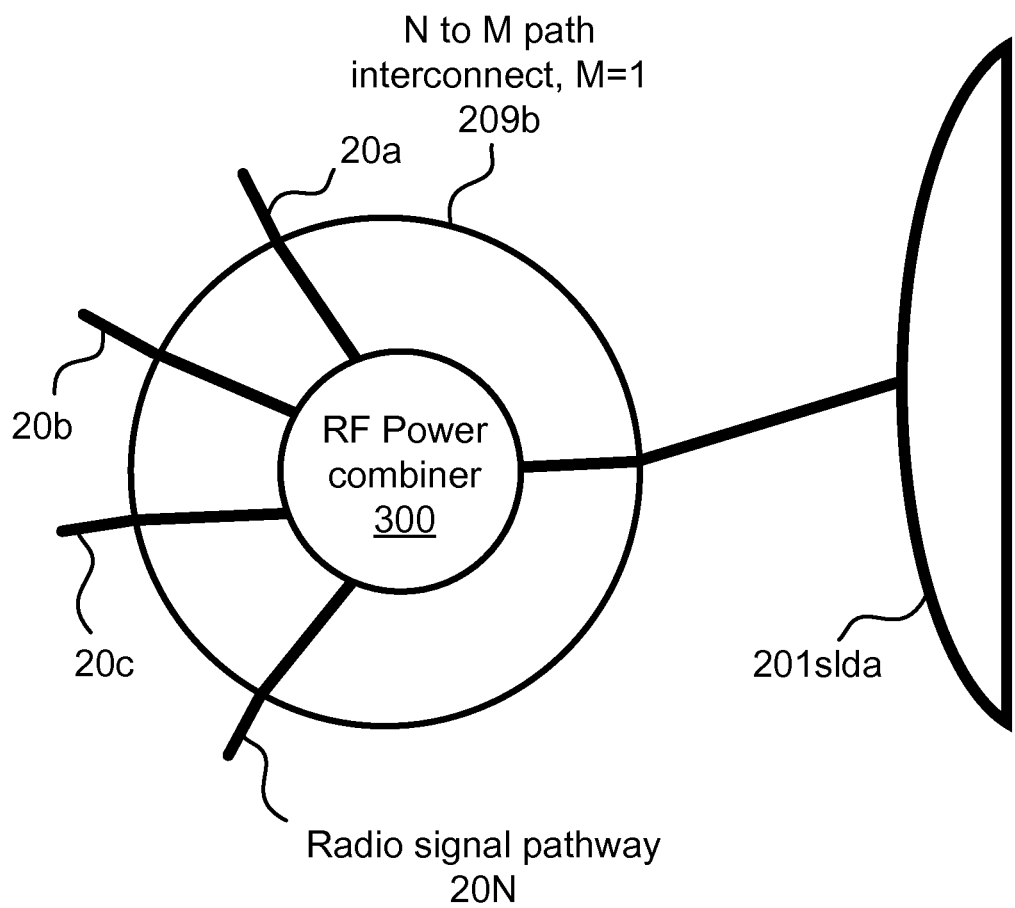
FIG. 4 illustrates one embodiment of components comprising a system in which N radio signal pathways are combined by an RF power combiner into one Backhaul antenna, and in which the Backhaul antenna includes a directional dish.

FIG. 2B illustrates one embodiment. Another embodiment is illustrated in FIG. 4, in which the single backhaul antenna is a dish, depicted as 201slda.

In one embodiment, in which N=M, and an RF power combiner 300 merges radio signal pathways 20a-20N into one radio signal pathway connected to a backhaul antenna, the combined RF output power of the N radio transceiver chains 200a-200N is substantially fully transferred to the one backhaul antenna. In this case, the backhaul antenna may be 201 sa or 201 slda or any other configuration for communication with the radio transceiver 102 of the Core Network 100.

In one embodiment, in which N=M, and an RF power combiner 300 merges radio signal pathways 20a-20N into one radio signal pathway connected to a backhaul antenna, the RF phases of the N radio transceiver chains are combined substantially coherently into the one radio signal pathway, thereby maximizing RF transmission power via the one backhaul antenna.

In one embodiment, the N RAN antennas 202a-202N are situated such that at least some of them are directed towards a location where wireless Subscriber Stations 111a-111K are present, and the location where wireless Subscriber Stations 111a-111K are present is substantially different than a location where the wireless transceiver 102 belonging to the Core Network 100 is present.

In one embodiment, the N RAN antennas 202a-202N comprise at least two groups of antennas, and each group of antennas forms a sector antenna facilitating communication with some wireless Subscriber Stations 111a-111K located within the coverage area of that sector antenna. 321a and 321b in FIG. 6, show sector antennas, but each sector antenna is shown as one antenna, whereas it is possible, as stated herein, that each sector antenna is made up of a group of antennas.

In one embodiment, the transmission power of each sector antenna (whether the sector antenna is made up of a single antenna or a group of antennas) is lower than a combined transmission power of M backhaul antennas 201a-201M. This may result when the transmission power of a sector antenna is fed by less than N radio transceiver chains 200a-200N, and the M backhaul antennas 201a-201M are fed by the N radio transceiver chains 200a-200N.

In one embodiment, the N RAN antennas 202a-202N are omni-directional and therefore substantially support wide-angle coverage, the M Backhaul antenna(s) 201a-201M is/are directional, and the M Backhaul antenna(s) 201a-201M are directed toward the wireless transceiver 102 belonging to the Core Network 100.

In one embodiment, the N RAN antennas 202a-201N are substantially incapable of supporting communication between the wireless BS 103 and the Core Network 100.

In one embodiment, the wireless BS 103, transiently stores at least some of the data received from the at least one wireless SS 111a-111K, before wirelessly communicating the at least some of the data between the wireless BS 103 and the wireless transceiver 102 of the Core Network 100.

In one embodiment, wirelessly communicated data between at least one wireless SS 111a-111K and the wireless BS 103, via the N radio transceiver chains 200a-200N and the corresponding N RAN antennas 202a-202N, is done using a first radio frequency range, and wirelessly communicating at least some of the data, via the N radio transceiver chains 200a-200N and the M Backhaul antennas 201a-201M, between the wireless BS 103 and the wireless transceiver 102 of the Core Network 100, is also done using the first radio frequency range, wherein using the same radio frequency range for both RAN communication and the Backhaul communication is considered an "In-Band Backhaul communication".

In one embodiment, the M Backhaul antennas 201a-201M are substantially better situated, as compared to the N RAN antennas 202a-202N, to facilitate communication with a wireless transceiver 102 belonging to the Core Network 100.

In one embodiment, there is system for wirelessly relaying data between a Core Network 100 and a Radio Access Network (RAN) 101, the system including (1) N radio transceiver chains 200a-200N, wherein N is equal to at least two, (2) N RAN antennas 202a-202N forming radiation patterns covering a first location of at least one wireless Subscriber Stations (SS) 111a-111K, (3) N Backhaul antennas 201a-201M forming a radiation pattern covering a second location of a wireless transceiver 102 belonging to the Core Network 100, and N RF switches 231a-234a, wherein the system communicates data wirelessly with at least one wireless SS 111a-111K, via the N radio transceiver chains 200a-200N and the corresponding N RAN antennas 202a-202N, then switches the N radio transceiver chains 200a-200N from the N RAN antennas 202a-202N to the N Backhaul antennas 201a-201M using the N RF switches 231a-234a, and communicates wirelessly at least some of the data, via the N radio transceiver chains 200a-200N and the N Backhaul antennas 201a-201M, with the wireless transceiver 102 of the Core Network 100, utilizing the aggregated RF power of the N radio transceiver chains 200a-200N.

In one embodiment, there is a system previously described for wirelessly relaying data between a Core Network 100 and a Radio Access Network (RAN) 101, wherein the N Backhaul antennas 201a-201M form a phased array antenna substantially directed toward the wireless transceiver 102 belonging to the Core Network 100.

In one embodiment, there is system for wirelessly relaying data between a Core Network 100 and a Radio Access Network (RAN) 101, in which there is a phased array antenna as previously described, and wherein the combined RF output power of the N radio transceiver chains 200a-200N is substantially fully transferred to the phased array antenna.

In one embodiment, there is system for wirelessly relaying data between a Core Network 100 and a Radio Access Network (RAN) 101, in which there is a phased array antenna as previously described, wherein the combined RF input power of the N radio transceiver chains 200a-200N is utilized to increase reception sensitivity of the wireless BS 103 in respect to signals arriving from the wireless transceiver 102 of the Core Network 100 via the phased array antenna.

In one embodiment, there is a system for wirelessly relaying data between a Core Network 100 and a Radio Access Network (RAN) 101, in which there is a phased array antenna as previously described, the system adjusts the RF phases of the N radio transceiver chains 200a-200N to correspond with a phased configuration forming a beam pattern directed toward the wireless transceiver 102 of the Core Network 100, prior to wirelessly communicating the at least some of the data between the wireless BS 103 and the wireless transceiver 102 of the Core Network 100.

In one embodiment, there is a system for wirelessly relaying data between a Core Network 100 and a Radio Access Network (RAN) 101, wherein the N Backhaul antennas 201a-201M form a Multiple-In-Multiple-Out (MIMO) antenna configuration together with antennas of the wireless transceiver 102 belonging to the Core Network 100.

In one embodiment, there is a system for wirelessly relaying data between a Core Network 100 and a Radio Access Network (RAN) 101, including a MIMO antenna configuration as previously described, wherein the combined RF output power of the N radio transceiver chains 200a-200N is substantially fully transferred to the MIMO antenna configuration.

In one embodiment, there is a system for wirelessly relaying data between a Core Network 100 and a Radio Access Network (RAN) 101, including a MIMO antenna configuration as previously described, wherein the combined RF input power of the N radio transceiver chains 200a-200N is utilized to increase reception sensitivity of the wireless BS 103 in respect to signals arriving from the wireless transceiver 102 of the Core Network 100 via the MIMO antenna configuration.

In one embodiment, there is a system for wirelessly relaying data between a Core Network 100 and a Radio Access Network (RAN) 101, including a MIMO antenna configuration as previously described, in which the system re-codes, by a processor, the at least some of the data to N streams of data facilitating the MIMO antenna configuration; and feed the N radio transceiver chains 200a-200N connected to the N Backhaul antennas 201a-201M with the M streams of data respectively.

In one embodiment, there is a system for wirelessly relaying between a Core Network 100 and a Radio Access Network (RAN) 101, wherein wirelessly communicating data between at least one wireless SS 111a-111K and the wireless BS 103, via the N radio transceiver chains 200a-200N and the corresponding N RAN antennas 202a-202N, is done using a first radio frequency range, and wirelessly communicating at least some of the data, via the N radio transceiver chains 200a-200N and the N Backhaul antennas 201a-201M, between the wireless BS 103 and the wireless transceiver 102 of the Core Network 100, is also done using the first radio frequency range, wherein using the same radio frequency range for both RAN communication and Backhaul communication is considered an In-Band Backhaul communication.

In one embodiment, there is a system for wirelessly relaying data between a Core Network 100 and a Radio Access Network (RAN) 101, the system including (1) N radio transceiver chains 200a-200N, wherein N is equal to at least two, (2) N RAN antennas 202a-202N forming radiation patterns covering a first location of at least one wireless Subscriber Stations (SS) 111a-111K, (3) one Backhaul antenna (from the group 201a-201M) forming a radiation pattern covering a second location of a wireless transceiver 102 belonging to the Core Network 100, (4) N RF switches 231a-234a, and (5) RF power combiner 300, wherein the system communicates data wirelessly with at least one wireless SS 111a-111K, via the N radio transceiver chains 200a-200N and the corresponding N RAN antennas 202a-202N, then switches the N radio transceiver chains 200a-200N from the N RAN antennas 202a-202N to the one Backhaul antenna (from 201a-201M) using the N RF switches 231a-234a and RF power combiner 300, and communicates wirelessly at least some of the data, via the N radio transceiver chains 200a-200N and the one Backhaul antenna (from 201a-201M), with the wireless transceiver 102 of the Core Network 100, utilizing the aggregated RF power of the N radio transceiver chains 200a-200N.

In one embodiment, a system for wirelessly relaying data between a Core Network 100 and a Radio Access Network (RAN) 101 as previously described, wherein the combined RF output power of the N radio transceiver chains 200a-200N is substantially fully transferred to the one backhaul antenna (from 201a-201M) using the N RF switches 231a-234a and the RF power combiner 300.

In one embodiment, a system for wirelessly relaying data between a Core Network 100 and a Radio Access Network (RAN) 101, wherein the combined RF output power of the N radio transceiver chains 200a-200n is substantially fully transferred to the one backhaul antenna (from 201a-201M) as previously described, wherein the system adjusts the RF phases of the N radio transceiver chains 200a-200N to combine substantially coherently into the one backhaul antenna (from 201a-201M), thereby maximizing RF transmission power.

Figure 7A:
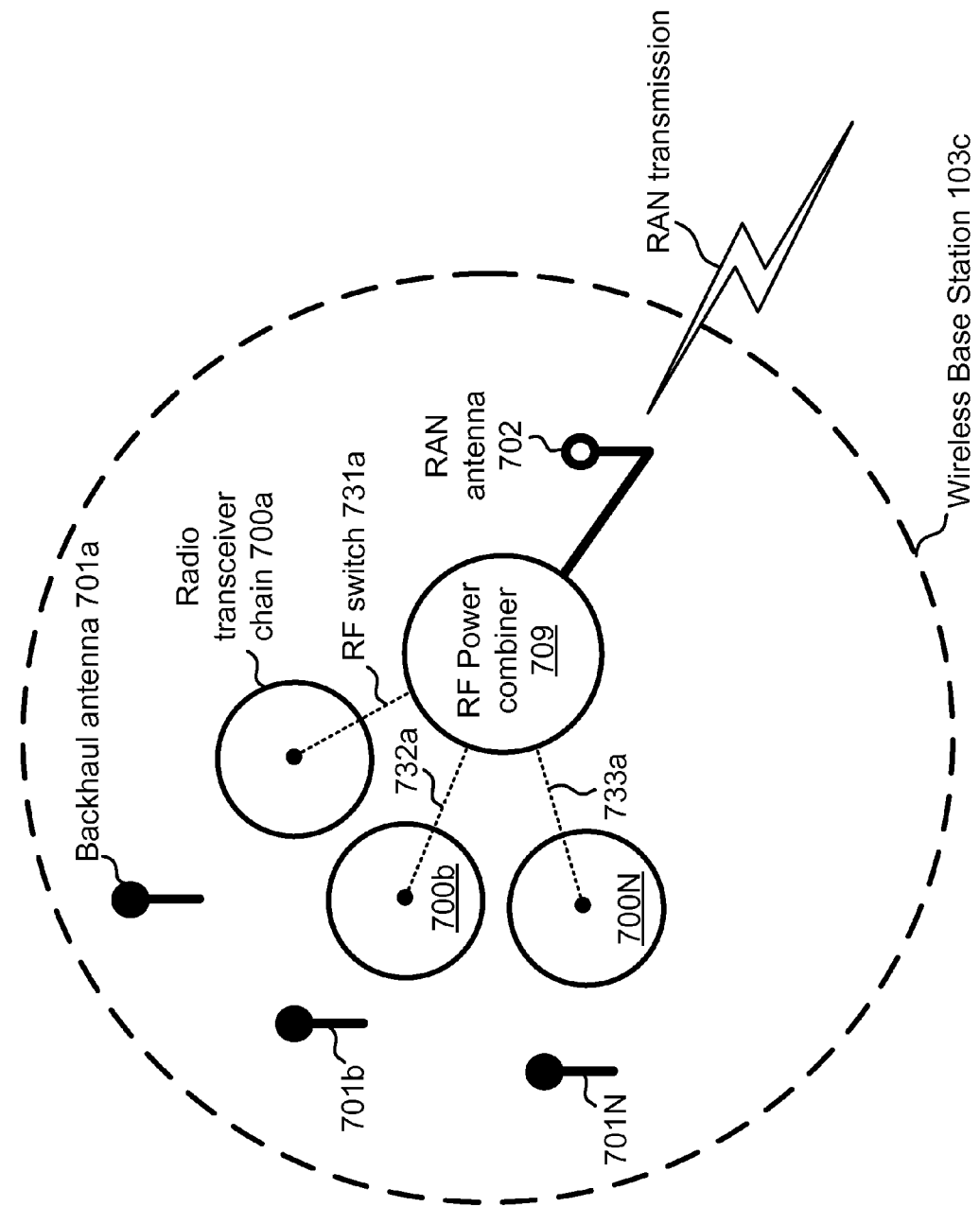
FIG. 7A illustrates one embodiment of components comprising a system in which N radio signal pathways are combined by an RF power combiner into one RAN antenna.

FIG. 7A illustrates the elements of a system for wirelessly relaying data between a Core Network (100, not shown in FIG. 7) and a Radio Access Network (RAN) (101, not shown in FIG. 7). The system includes (1) N backhaul antennas 700a-700N that communicate with the wireless transceiver 102 of the Core Network 100, (2) a RAN antenna 702, that communicates with wireless Subscriber Stations 111a-111K (not shown in FIG. 7), (3) an RF power combiner that mergers the RF power of the radio transceiver chains 700a-700N, and (4) N RF switches 731a-733a, that connect the N radio transceiver chains to the RF power combiner 709. In FIG. 7A, communication is enabled between the RAN antenna 702 and the wireless SS 111a-111K.

Figure 7B:
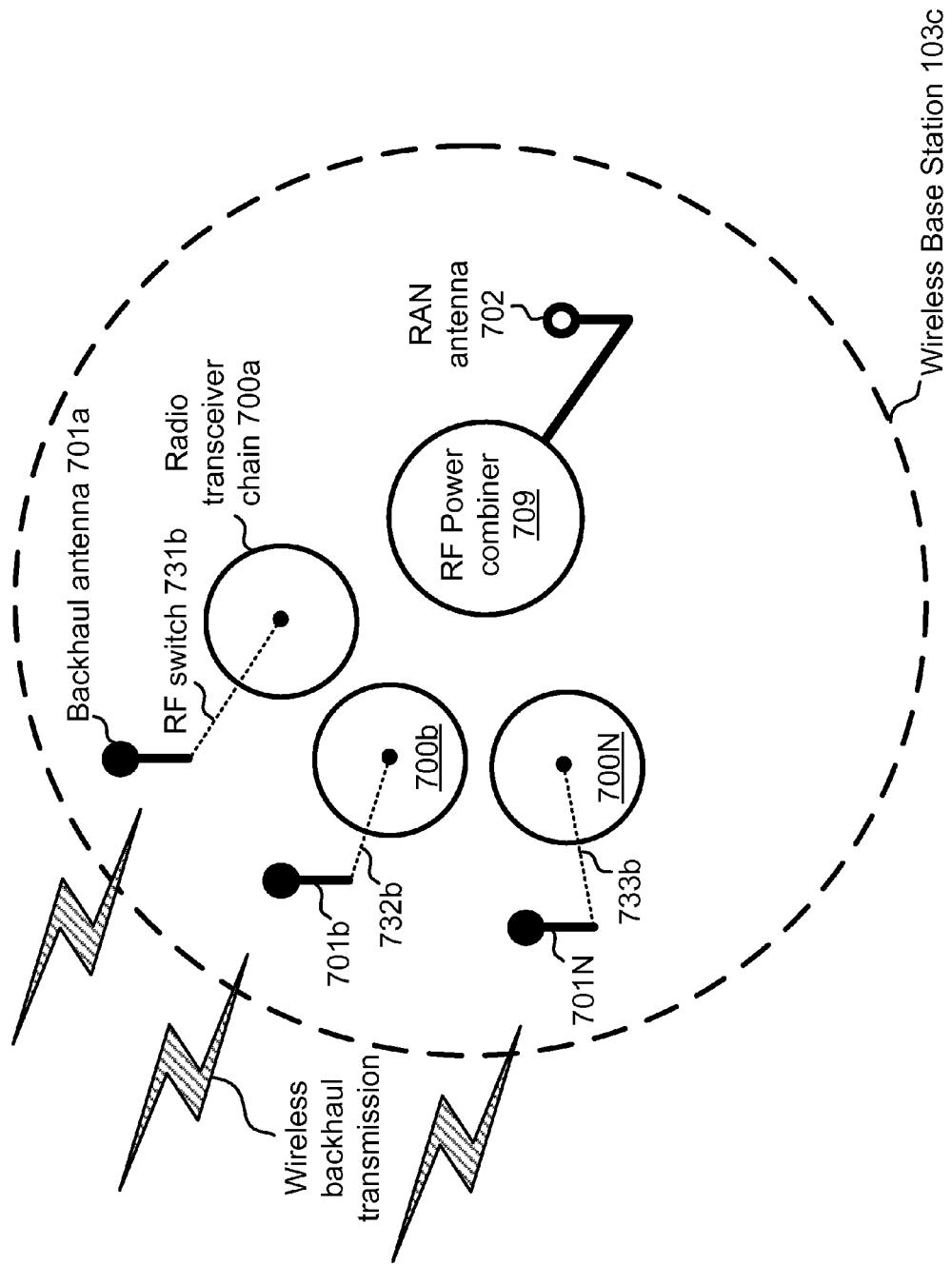
FIG. 7B illustrates one embodiment of components comprising a system in which N radio receiver chains are connected to N Backhaul antennas.

FIG. 7B illustrates the same structural elements as does FIG. 7A, but in a different position, at a different point of time. In FIG. 7B, the RF switches are not connecting the radio receiver chains 700a-700N to the RF power combiner 709 as in FIG. 7A, but rather connect the radio transceiver chains 700a-700N to the backhaul antennas 701a-701N. At the point of time, and in the position, illustrated in FIG. 7B, communication is enabled between the wireless transceiver 102 of the Core Network 100 and the backhaul antennas 701a-701N.

In one embodiment, data is wirelessly relayed between a Core Network 100 and a Radio Access Network (RAN) 101, utilizing an aggregated Radio Frequency (RF) power of a plurality of radio transceiver chains 700a-700N. A RAN 101 including a wireless BS 103c, operates, in which the wireless BS 103c includes N radio transceiver chains 700a, 700b, to 700N when N is equal to at least two, and a RAN antenna 702. The N radio transceiver chains 700a-700N are connected to the RAN antenna 702 via an RF power combiner 709. Data is communicated wirelessly between at least one wireless Subscriber Station (SS) 111a-111K and the wireless BS 103c, via the N radio transceiver chains 700a-700N and the RAN antenna 702, utilizing the aggregated RF power of the N radio transceiver chains 700a-700N. The wireless BS 103c disconnects the N radio transceiver chains 700a-700N from the RAN antenna 702. The wireless BS 103c connects the N radio transceiver chains 700a-700N to N backhaul antennas 701a, 701b, to 701N, belonging to the wireless BS 103c. At least some of the data is wirelessly communicated, via the N radio transceiver chains 700a-700N and the N backhaul antennas 701a-701N, between the wireless BS 103c and a wireless transceiver 102 of the Core Network 100.

In one embodiment, there is system for wirelessly relaying data between a Core Network 100 and a Radio Access Network (RAN) 101, the system including (1) N radio transceiver chains 700a-700N, wherein N is equal to at least two, (2) a RAN antenna 702 covering a first location of at least one wireless Subscriber Stations (SS) 111a-111K, (3) N Backhaul antennas 701a-701N covering a second location of a wireless transceiver belonging to the Core Network 100, (4) N RF switches (either 731a, 732a, and 733a, or 731b, 732b and 733b, depending on whether radio transceiver chains 701a-701N are connected to an RF power combiner 709 or the N backhaul antennas 701a-701N, respectively); and an RF power combiner 709, wherein the system communicates data wirelessly with at least one wireless SS 111a-111K, via the N radio transceiver chains 700a-700N connected to the RAN antenna 702 via the RF power combiner 709 utilizing the aggregated RF power of the N radio transceiver chains 700a-700N, then switches the N radio transceiver chains 700a-700N from the RAN antenna 702 to the N Backhaul antennas 701a-701N using the N RF switches (731a-733a an 731b-733b), and communicates wirelessly at least some of the data, via the N radio transceiver chains 700a-700N and the N Backhaul antennas 701a-701N, with the wireless transceiver 102 of the Core Network 100.

Figure 8:
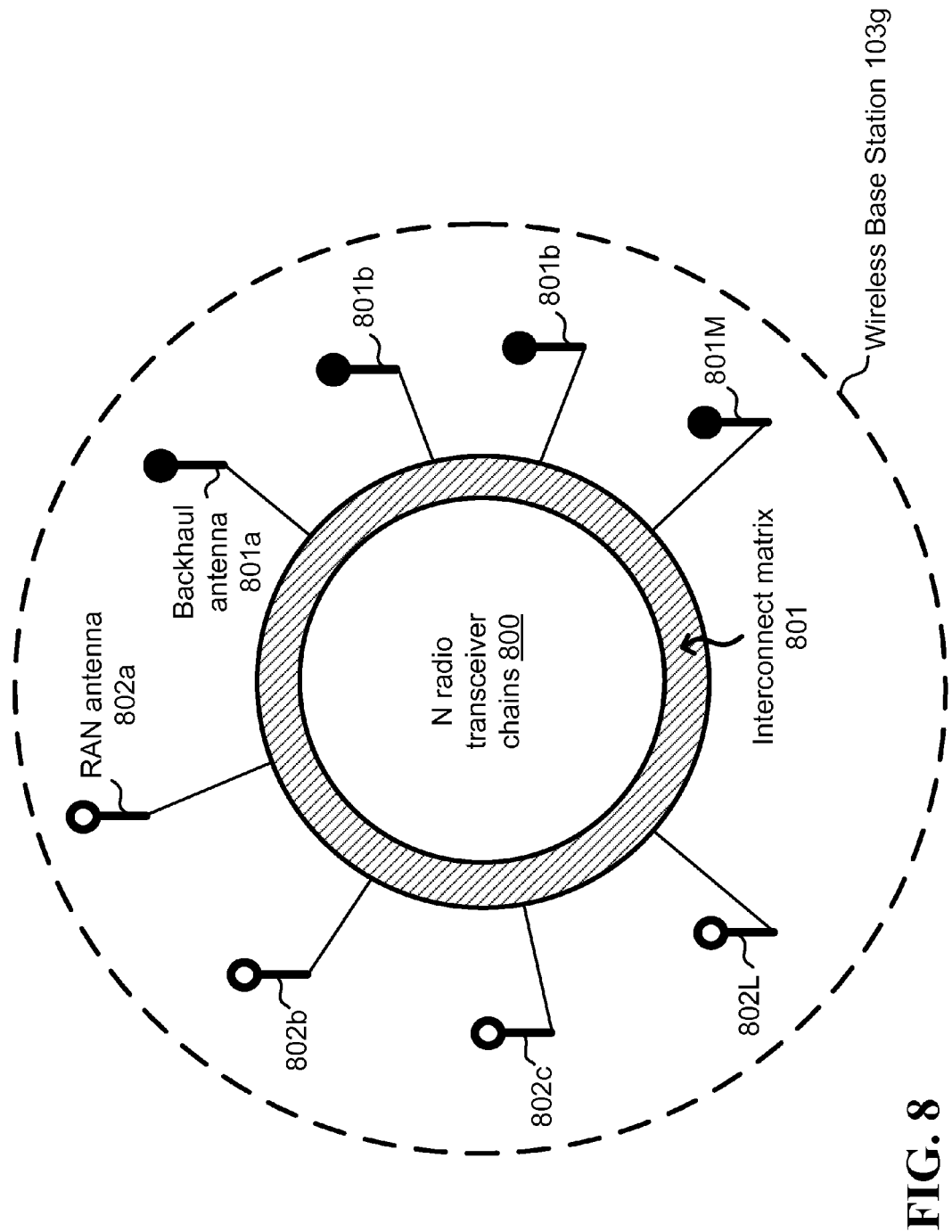
FIG. 8 illustrates one embodiment of components comprising a system in which any number of RAN antennas are connected by N radio receiver chains and an Interconnect matrix to any number of Backhaul antennas.

In one embodiment, there is a system for wirelessly relaying data between a Core Network and a Radio Access Network (RAN). Structural elements of this system are illustrated in FIG. 8, in which the system includes (1) N radio transceiver chains 800, wherein N is equal to at least two, (2) L RAN antennas 802a-802L (including 802a, 802b, 802c, and 802L, in FIG. 8) covering a first location of at least one wireless Subscriber Stations (SS) 111a-111K (not shown in FIG. 8), wherein L is equal to or less than N, (3) M Backhaul antennas 801a-801M (including 801a, 801b, 801c and 801M, in FIG. 8) covering a second location of a wireless transceiver 102 belonging to the Core Network 100, wherein M is equal to or less than N; and (4) an interconnect matrix 801 switching and power combine the N radio transceiver chains 800 with the L RAN antennas 802a-802L and the M Backhaul antennas 801a-801M. This system communicates data wirelessly with at least one wireless SS 111a-111K, via at least two of the N radio transceiver chains 800 connected to at the least one of the L RAN antennas 802a-802L via the interconnect matrix 801, connects at least two of the N radio transceiver chains 802a-802L to at least one of the M Backhaul antennas 801a-801M using the interconnect matrix 801; and communicates wirelessly at least some of the data, via the recently connected radio transceiver chains 800 and the at least one of the M Backhaul antennas 801a-801M, with the wireless transceiver 102 of the Core Network 100.

Figure 9:
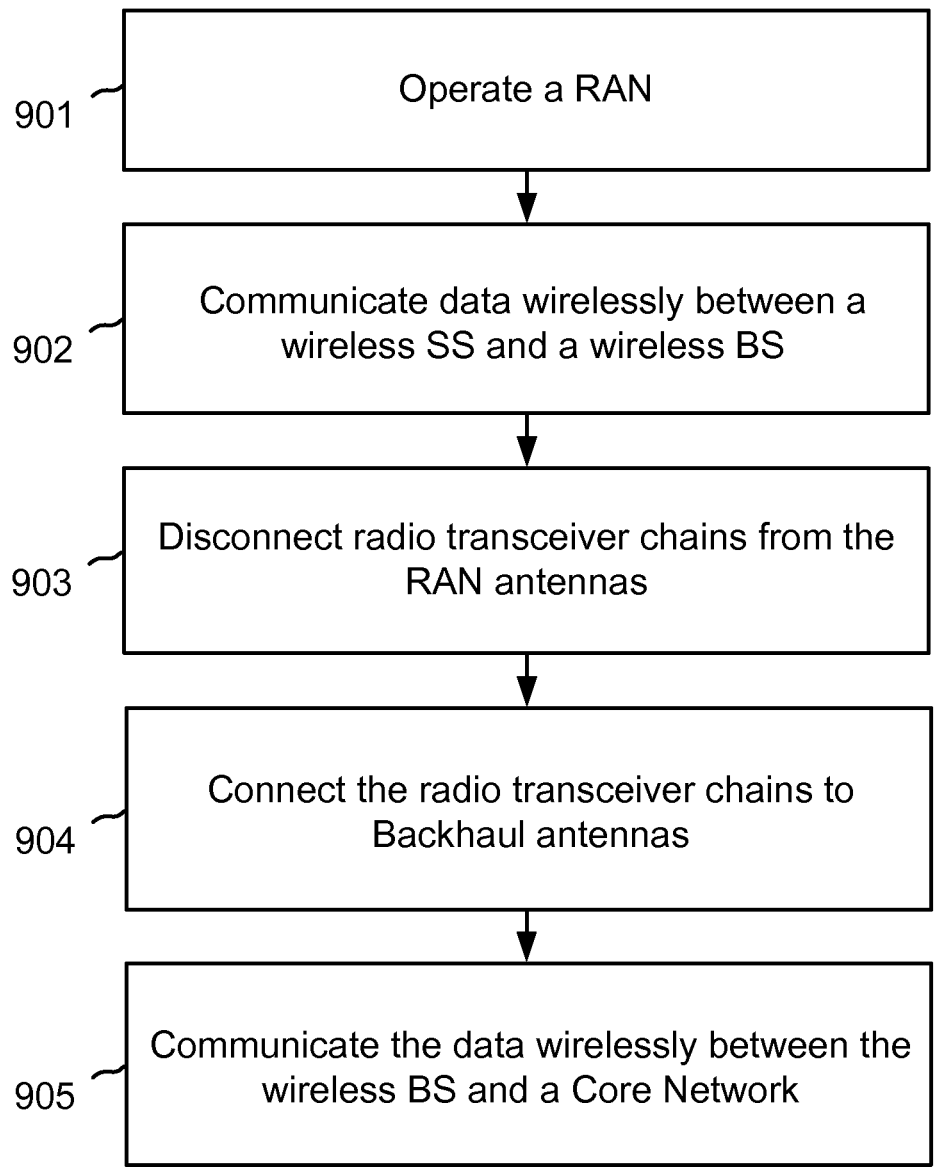
FIG. 9 illustrates one embodiment of the elements of a method in which data is wirelessly relayed between a RAN and a Core Network.

FIG. 9 illustrates a flow diagram describing one method for wirelessly relaying data between a Core Network 100 and a RAN 101, utilizing an aggregated Radio Frequency (RF) power of a plurality of radio transceiver chains 200a-200N. In step 901, operating a RAN 101, comprising a wireless Base Station (BS) 103, the wireless BS 103 comprising N radio transceiver chains 200a-200N and corresponding N RAN antennas 202a-202N, wherein N is equal to at least two. In step 902, communicating data wirelessly between at least one wireless Subscriber Station (SS) among 111a-111K and the wireless BS 103, via the N radio transceiver chains 200a-200N and the corresponding N RAN antennas 202a-202N. In step 903, disconnecting, by the wireless BS 103, the N radio transceiver chains 200a-200N from the N RAN antennas. 202a-202N. In step 904, connecting, by the wireless BS 103, the N radio transceiver chains 200a-200N to N radio signal pathways 20a-20N leading to M Backhaul antennas 201a-201M belonging to the wireless BS 103. In step 905, wirelessly communicating at least some of the data, via the N radio transceiver chains 200a-200N and the M Backhaul antennas 201a-201M, between the wireless BS 103 and a wireless transceiver of the Core Network 102, utilizing the aggregated RF power of the N radio transceiver chains 200a-200N.

Figure 10:
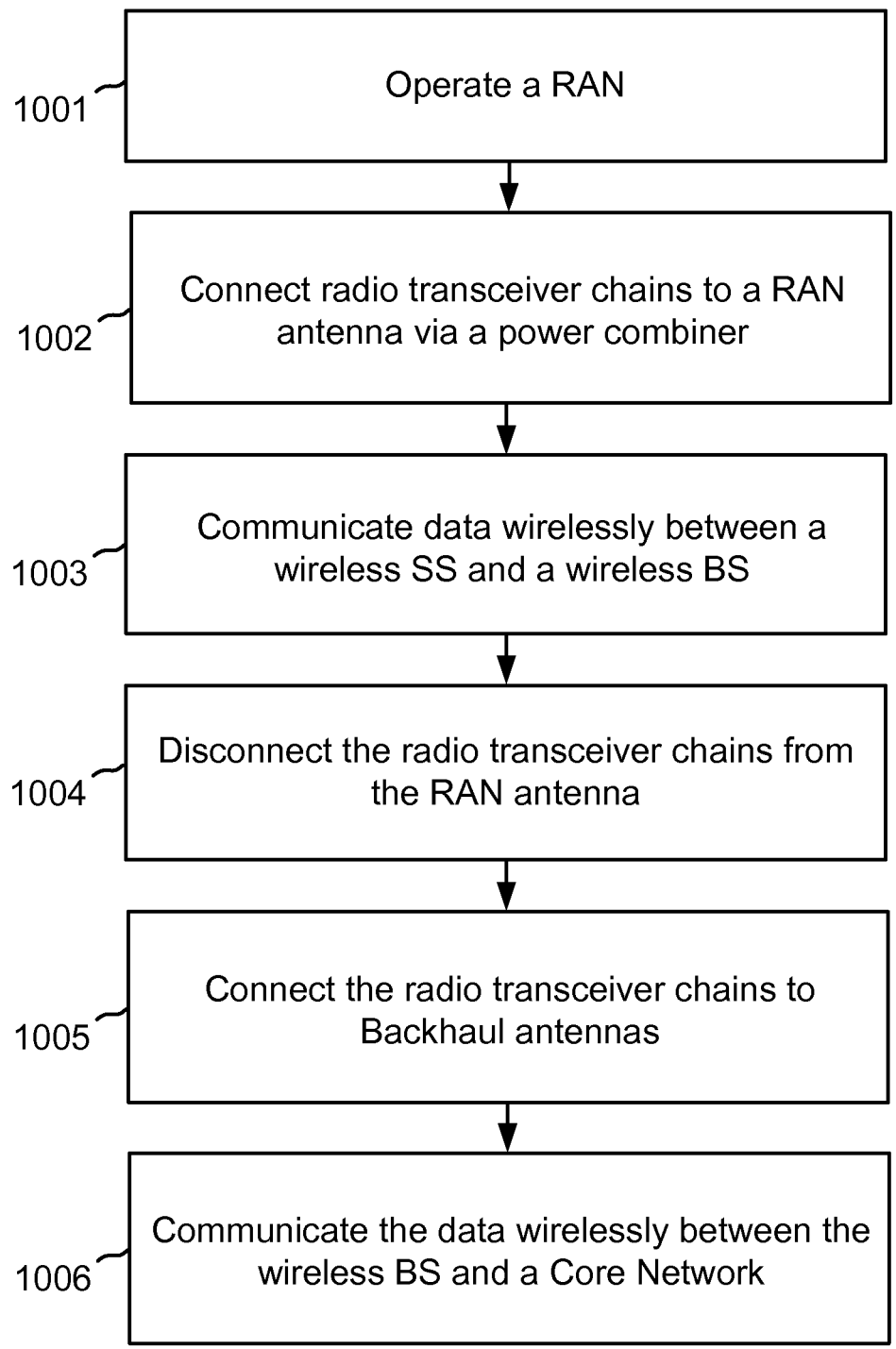
FIG. 10 illustrates one embodiment of the elements of a method in which data is wirelessly relayed between a Core Network and a RAN.

FIG. 10 illustrates a flow diagram describing one method for wirelessly relaying data between a Core Network 100 and a RAN 101, utilizing an aggregated Radio Frequency (RF) power of a plurality of radio transceiver chains 700a-700N. In step 1001, operating a RAN, comprising a wireless Base Station (BS) 103c, the wireless BS 103c comprising N radio transceiver chains 700a-700N and a RAN antenna 702, wherein N is equal to at least two. In step 1002, connecting the N radio transceiver chains 700a-700N to the RAN antenna 702. In step 1003, communicating data wirelessly between at least one wireless Subscriber Station (SS) among 111a-111K and the wireless BS 103c, via the N radio transceiver chains 700a-700N and the RAN antenna 702, utilizing the aggregated power RF power of the N radio transceiver chains 700a-700N. In step 1004, disconnecting, by the wireless BS 103c, the N radio transceiver chains 700a-700N from the RAN antenna 702. In step 1005, connecting, by the wireless BS 103c, the N radio transceiver chains 700a-700N to N backhaul antennas 701a-701N. In step 1006, wirelessly communicating at least some of the data, via the N radio transceiver chains 700a-700N and the N backhaul antennas 701a-

701N, between the wireless BS 103c and a wireless transceiver of the Core Network 102.

In this description, numerous specific details are set forth. However, the embodiments of the invention may be practiced without some of these specific details. In other instances, well-known hardware, software, materials, structures and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to cover also the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications and variations will be apparent to those skilled in the art. It is to be understood that other embodiments may be utilized and structural changes may be made without departing from the scope of the embodiments. Accordingly, it is intended to embrace all such alternatives, modifications and variations that fall within the spirit and scope of the appended claims and their equivalents.

What is claimed is:

1. A method for wirelessly relaying data between a Core Network and a Radio Access Network (RAN), utilizing an aggregated Radio Frequency (RF) power of a plurality of radio transceiver chains, comprising:

operating a RAN comprising a wireless Base Station (BS), the wireless BS comprising N radio transceiver chains and corresponding N RAN antennas, wherein N is equal to at least two;

communicating data wirelessly between at least one wireless Subscriber Station (SS) and the wireless BS, via the N radio transceiver chains and the corresponding N RAN antennas;

disconnecting, by the wireless BS, the N radio transceiver chains from the N RAN antennas;

connecting, by the wireless BS, the N radio transceiver chains to N radio signal pathways leading to M Backhaul antennas belonging to the wireless BS; and wirelessly communicating at least some of the data, via the N radio transceiver chains and the M Backhaul antennas, between the wireless BS and a wireless transceiver of the Core Network, utilizing the aggregated RF power of the N radio transceiver chains.

2. The method of claim 1, wherein the M Backhaul antennas are better situated, as compared to the N RAN antennas, to facilitate communication with a wireless transceiver belonging to the Core Network.

3. The method of claim 2, wherein M equals N, each of the N radio transceiver chains connects to a corresponding one of the M Backhaul antennas via a corresponding one of the N radio signal pathways, and the M Backhaul antennas form a phase array antenna substantially directed toward the wireless transceiver belonging to the Core Network.

4. The method of claim 3, wherein the combined RF output power of the N radio transceiver chains is substantially fully transferred to the phase array antenna.

5. The method of claim 3, wherein the combined RF input power of the N radio transceiver chains is utilized to increase reception sensitivity of the wireless BS in respect to signals arriving from the wireless transceiver of the Core Network via the phase array antenna.

6. The method of claim 3, further comprising adjusting the RF phases of the N radio transceiver chains to correspond with a phase configuration operative to forming a beam pattern directed toward the wireless transceiver of the Core Network, prior to wirelessly communicating the at least some of the data between the wireless BS and the wireless transceiver of the Core Network.

7. The method of claim 2, wherein M equals N, each of the N radio transceiver chains connects to a corresponding one of the M Backhaul antennas via a corresponding one of the N radio signal pathways, and the M Backhaul antennas form a Multiple-In-Multiple-Out (MIMO) antenna configuration together with antennas of the wireless transceiver belonging to the Core Network.

8. The method of claim 7, wherein the combined RF output power of the N radio transceiver chains is substantially fully transferred to the MIMO antenna configuration.

9. The method of claim 7, wherein the combined RF input power of the N radio transceiver chains is utilized to increase reception sensitivity of the wireless BS in respect to signals arriving from the wireless transceiver of the Core Network via the MIMO antenna configuration.

10. The method of claim 7, further comprising re-coding the at least some of the data to M streams of data facilitating the MIMO antenna configuration; and feeding the N radio transceiver chains connected to the M Backhaul antennas with the M streams of data respectively.

11. The method of claim 2, wherein the M number of Backhaul antennas is one, the N radio signal pathways are merged into one radio signal pathway connected to the one Backhaul antenna, and the one Backhaul antenna is substantially directed toward the wireless transceiver belonging to the Core Network.

12. The method of claim 11, wherein the combined RF output power of the N radio transceiver chains is substantially fully transferred to the one Backhaul antenna.

13. The method of claim 11, further comprising adjusting the RF phases of the N radio transceiver chains to combine substantially coherently into the one radio signal pathway, thereby maximizing RF transmission power via the one Backhaul antenna.

14. The method of claim 2, wherein the N RAN antennas are situated such that at least some of the N RAN antennas are directed towards a location where wireless Subscriber Stations are present, and the location where wireless Subscriber Stations are present is substantially different than a location where the wireless transceiver belonging to the Core Network is present.

15. The method of claim 14, wherein the N RAN antennas comprise at least two groups of antennas, and each group of antennas forms a sector antenna operative to facilitate communication with some wireless Subscriber Stations located within the coverage area of that sector antenna.

16. The method of claim 15, wherein a transmission power of each sector antenna is lower than a combined transmission power of the M Backhaul antennas, as a result of the sector antenna being fed by less than N radio transceiver chains and the M Backhaul antennas being fed by N radio transceiver chains.

17. The method of claim 2, wherein the N RAN antennas are omni-directional and therefore substantially support wide angle coverage, the M Backhaul antenna/s are/is directional, and the M Backhaul antennas are directed toward the wireless transceiver belonging to the Core Network.

18. The method of claim 17, wherein the N RAN antennas are substantially incapable of supporting communication between the wireless BS and the Core Network.

19. The method of claim 2, further comprising transiently storing, by the wireless BS, at least some of the data received from the at least one wireless SS, before wirelessly communicating the at least some of the data between the wireless BS and the wireless transceiver of the Core Network.

20. The method of claim 1, wherein wirelessly communicating data between at least one wireless SS and the wireless BS, via the N radio transceiver chains and the corresponding N RAN antennas, is done using a first radio frequency range, and wirelessly communicating at least some of the data, via the N radio transceiver chains and the M Backhaul antennas, between the wireless BS and the wireless transceiver of the Core Network, is also done using the first radio frequency range, wherein using the same radio frequency range for both RAN communication and Backhaul communication is considered an In-Band Backhaul communication.

21. The method of claim 20, wherein the M Backhaul antennas are substantially better situated, as compared to the N RAN antennas, to facilitate communication with a wireless transceiver belonging to the Core Network.

22. A system for wirelessly relaying data between a Core Network and a Radio Access Network (RAN), comprising:
  N radio transceiver chains, wherein N is equal to at least two;
  N RAN antennas operative to form radiation patterns covering a first location of at least one wireless Subscriber Stations (SS);
  N Backhaul antennas operative to form a radiation pattern covering a second location of a wireless transceiver belonging to the Core Network; and
  N RF switches;
  wherein the system is configured to:
  communicate data wirelessly with at least one wireless SS, via the N radio transceiver chains and the corresponding N RAN antennas;
  switch the N radio transceiver chains from the N RAN antennas to the N Backhaul antennas using the N RF switches; and
  communicate wirelessly at least some of the data, via the N radio transceiver chains and the N Backhaul antennas, with the wireless transceiver of the Core Network, utilizing the aggregated RF power of the N radio transceiver chains.

23. The system of claim 22, wherein the N Backhaul antennas form a phase array antenna substantially directed toward the wireless transceiver belonging to the Core Network.

24. The system of claim 23, wherein the combined RF output power of the N radio transceiver chains is substantially fully transferred to the phase array antenna.

25. The system of claim 23, wherein the combined RF input power of the N radio transceiver chains is utilized to increase reception sensitivity of the wireless BS in respect to signals arriving from the wireless transceiver of the Core Network via the phase array antenna.

26. The system of claim 23, further configured to adjust the RF phases of the N radio transceiver chains to correspond with a phase configuration operative to forming a beam pattern directed toward the wireless transceiver of the Core Network, prior to wirelessly communicating the at least some of the data between the wireless BS and the wireless transceiver of the Core Network.

27. The system of claim 22, wherein the N Backhaul antennas form a Multiple-In-Multiple-Out (MIMO) antenna configuration together with antennas of the wireless transceiver belonging to the Core Network.

28. The system of claim 27, wherein the combined RF output power of the N radio transceiver chains is substantially fully transferred to the MIMO antenna configuration.

29. The system of claim 27, wherein the combined RF input power of the N radio transceiver chains is utilized to increase reception sensitivity of the wireless BS in respect to signals arriving from the wireless transceiver of the Core Network via the MIMO antenna configuration.

30. The system of claim 27, further configured to re-code, by a processor, the at least some of the data to N streams of data facilitating the MIMO antenna configuration; and feed the N radio transceiver chains connected to the N Backhaul antennas with the M streams of data respectively.

31. The system of claim 22, wherein wirelessly communicating data between at least one wireless SS and the wireless BS, via the N radio transceiver chains and the corresponding N RAN antennas, is done using a first radio frequency range, and wirelessly communicating at least some of the data, via the N radio transceiver chains and the N Backhaul antennas, between the wireless BS and the wireless transceiver of the Core Network, is also done using the first radio frequency range, wherein using the same radio frequency range for both RAN communication and Backhaul communication is considered an In-Band Backhaul communication.

32. A system for wirelessly relaying data between a Core Network and a Radio Access Network (RAN), comprising:
  N radio transceiver chains, wherein N is equal to at least two;
  N RAN antennas operative to form radiation patterns covering a first location of at least one wireless Subscriber Stations (SS);

one Backhaul antenna operative to form a radiation pattern covering a second location of a wireless transceiver belonging to the Core Network;

N RF switches; and

RF power combiner;

wherein the system is configured to:

communicate data wirelessly with at least one wireless SS, via the N radio transceiver chains and the corresponding N RAN antennas;

switch the N radio transceiver chains from the N RAN antennas to the one Backhaul antenna using the N RF switches and RF power combiner; and communicate wirelessly at least some of the data, via the N radio transceiver chains and the one Backhaul antenna, with the wireless transceiver of the Core Network, utilizing the aggregated RF power of the N radio transceiver chains.

33. The system of claim 32, wherein the combined RF output power of the N radio transceiver chains is substantially fully transferred to the one Backhaul antenna using the N RF switches and the RF power combiner.

34. The system of claim 33, further configured to adjust the RF phases of the N radio transceiver chains to combine substantially coherently into the one Backhaul antenna, thereby maximizing RF transmission power.

35. A method for wirelessly relaying data between a Core Network and a Radio Access Network (RAN), utilizing an aggregated Radio Frequency (RF) power of a plurality of radio transceiver chains, comprising:

operating a RAN comprising a wireless Base Station (BS), the wireless BS comprising N radio transceiver chains and a RAN antenna, wherein N is equal to at least two;

connecting the N radio transceiver chains to the RAN antenna via an RF power combiner;

communicating data wirelessly between at least one wireless Subscriber Station (SS) and the wireless BS, via the N radio transceiver chains and the RAN antenna, utilizing the aggregated RF power of the N radio transceiver chains;

disconnecting, by the wireless BS, the N radio transceiver chains from the RAN antenna;

connecting, by the wireless BS, the N radio transceiver chains to N Backhaul antennas belonging to the wireless BS; and wirelessly communicating at least some of the data, via the N radio transceiver chains and the N Backhaul antennas, between the wireless BS and a wireless transceiver of the Core Network.

36. A system for wirelessly relaying data between a Core Network and a Radio Access Network (RAN), comprising:

N radio transceiver chains, wherein N is equal to at least two;

a RAN antenna operative to cover a first location of at least one wireless Subscriber Stations (SS);

N Backhaul antennas operative to cover a second location of a wireless transceiver belonging to the Core Network;

N RF switches; and

RF power combiner;

wherein the system is configured to:

communicate data wirelessly with at least one wireless SS, via the N radio transceiver chains connected to the RAN antenna via the RF power combiner, utilizing the aggregated RF power of the N radio transceiver chains;

switch the N radio transceiver chains from the RAN antenna to the N Backhaul antennas using the N RF switches; and communicate wirelessly at least some of the data, via the N radio transceiver chains and the N Backhaul antennas, with the wireless transceiver of the Core Network.

37. A system for wirelessly relaying data between a Core Network and a Radio Access Network (RAN), comprising:

N radio transceiver chains, wherein N is equal to at least two;

L RAN antennas operative to cover a first location of at least one wireless Subscriber Stations (SS), wherein L is equal to at most N;

M Backhaul antennas operative to cover a second location of a wireless transceiver belonging to the Core Network, wherein M is equal to at most N; and an interconnect matrix operative to switch and power combine the N radio transceiver chains with the L RAN antennas and the M Backhaul antennas;

wherein the system is configured to:

communicate data wirelessly with at least one wireless SS, via at least two of the N radio transceiver chains connected to the at least one of the L RAN antenna via the interconnect matrix;

connect at least two of the N radio transceiver chains to at least one of the M Backhaul antennas using the interconnect matrix; and communicate wirelessly at least some of the data, via the recently connected radio transceiver chains and the at least one of the M Backhaul antennas, with the wireless transceiver of the Core Network.

* * * * *